A. RICKART.
Horse Hay-Rakes.

No. 147,432. Patented Feb. 10, 1874.

Witnesses.
John Becker
Fred Haynes

UNITED STATES PATENT OFFICE.

ALEXANDER RICKART, OF SCHOHARIE, NEW YORK.

IMPROVEMENT IN HORSE HAY-RAKES.

Specification forming part of Letters Patent No. 147,432, dated February 10, 1874; application filed November 22, 1873.

*To all whom it may concern:*

Be it known that I, ALEXANDER RICKART, of Schoharie, in the county of Schoharie and State of New York, have invented Improvements in Horse Hay-Rakes, of which the following is a specification:

The invention consists, first, in the combination of a toothed sector, having a series of holes, with a lever having its fulcrum on the shaft or pivot of said sector, and provided with a pin for engagement with said holes to lock the end of the lever to the sector in different positions for the purpose of enabling the driver to raise and lower the rake-teeth; second, in the combination of a cam-faced foot-lever with a pin or projection on the shifting lever, to enable the driver to depress the rake-teeth by pressure with his foot; third, in a cleaning device, consisting of teeth passing through a bar arranged slightly below and rearward of the axle, and having their upper ends fastened in a bar arranged above the axle, whereby the hay is detached from the rake-teeth, and prevented from interfering with the axle.

Figure 1:
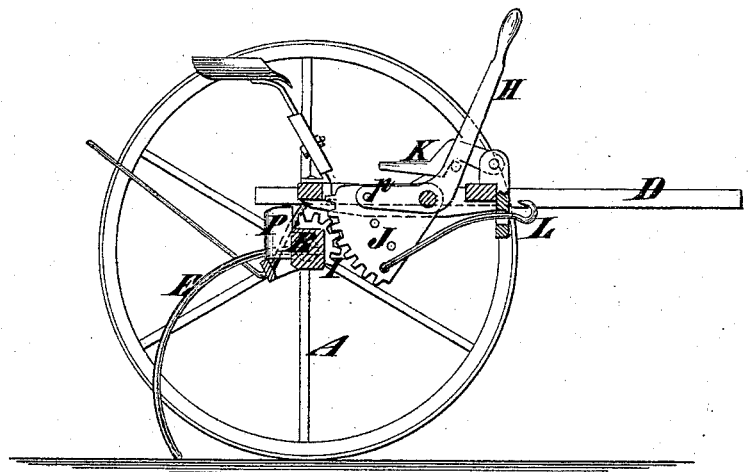
Figure 2:
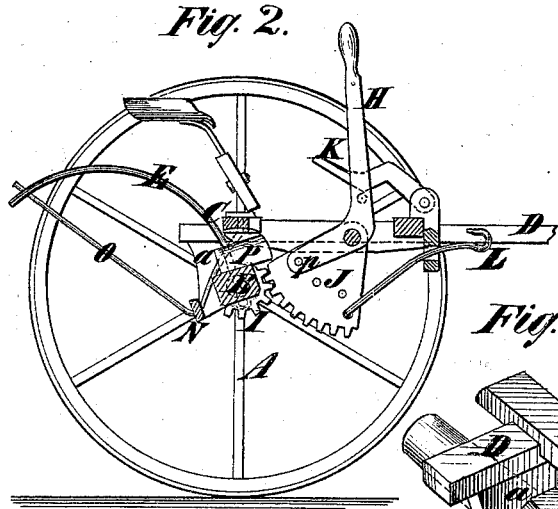
Figure 3:
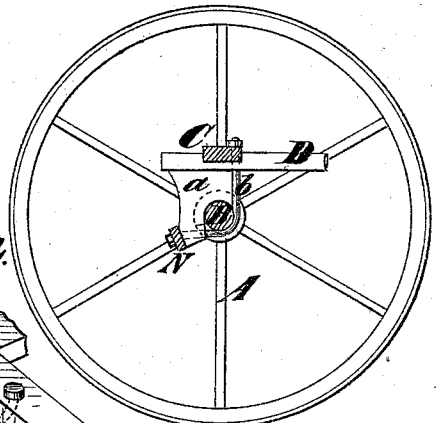
Figure 4:
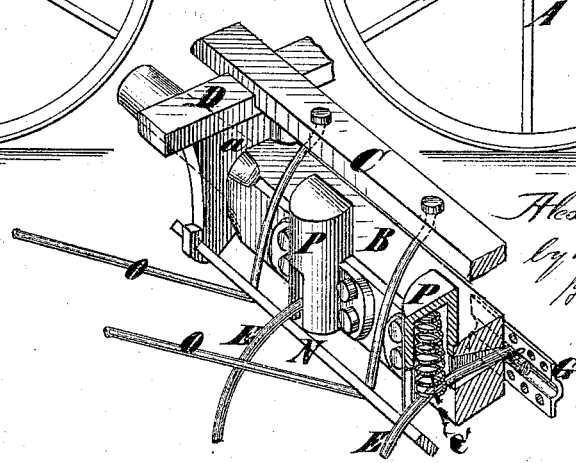

In the accompanying drawing, Figure 1 is a central longitudinal section of a horse hay-rake made with these improvements and representing the rake-teeth in operation. Fig. 2 is a like view, showing the rake-teeth raised. Fig. 3 is a section illustrating the mode of fastening the frame or body of the machine to its axle; and Fig. 4 is a perspective view of the axle and its appurtenances, showing the application of the raking-teeth and cleaner-teeth to it.

Similar letters of reference indicate corresponding parts in all the figures.

A A are the wheels on which the machine travels, and B is their axle, to which the frame of the machine, consisting essentially of an upper cross-bar, C, and the thills or shafts D D, is connected in a manner affording provision for the axle to turn freely by two bearings, $a$ $a$, and bent rods $b$ $b$, or straps fitting circular necks formed on the square body of the axle to receive them. For the reception of the raking-teeth E E the square body of the axle just alluded to is provided with a series of narrow slots, which are made flaring toward their rear ends, so as to permit the up-and-down movement of the teeth in accommodating themselves to irregularities in the ground they pass over. On the inner end of each tooth there is a journal, $e$, which is formed like an elbow, and fits against the forward side of the axle, and is held in place by a box, G, fastened to the axle by bolts or screws. The teeth are, of course, inserted in the slots from the forward side of the axle, and the boxes are secured afterward. Opposite these slots the axle is furnished on its rear side with a number of boxes, P P, which are cylindrical in their interiors, and are slotted to permit the teeth to pass through them. They contain spiral springs $c$ $c$, that press against the teeth and hold them down to the ground, but afford them freedom to yield whenever they come in contact with any small projection or irregularity in the ground, and thus obviate the necessity of raising them, except when any material obstruction lies in their way. Besides this, the boxes give the teeth a more extended support, and thereby reduce their liability to lateral flexure. The shifting-lever H, that effects the raising and lowering of the teeth, is connected with the axle by two toothed sectors, a small one, I, on the axle, and one, J, of much longer radius, pivoted to the frame of the machine and connected to the shifting-lever. The disparity in the relative sizes of the two sectors enables a comparatively slight movement of the lever H to effect a much greater movement of the axle, so that the driver can raise or lower the rake-teeth a considerable distance without having to lean very far out of his seat. To render this shifting still more easy, the lever is pivoted to the pivot of the sector J, and is connected with it by a pin, $p$, so that it may be connected at different points, thus to afford convenience for arranging the lever in the most convenient position to perform its work. A lever, K, pivoted to the frame, engages with a pin on the side of the lever, and, when held down by the driver's foot, holds the lever in position to retain the teeth in position for work. It has an oblique cam-like surface where it bears against the pin, which, acting on the pin, forces the lever H back and depresses the rake-teeth. The leverage of the lever H and the leverage of the foot-lever K together form a compound leverage, which renders it an easy matter for the driver to depress the rake-teeth after they have been raised. The draft-hook L, or any other device which may be used for hitching the horses to the rake, is fastened to the sector J in such manner that the driver, whenever he sees any obstruction in the way of the rake-teeth, may, by simply removing his foot from the lever K, release the lever H, and then, the sector being freed, the draft causes it to move and shift the axle, thereby raising the teeth to pass the obstruction. After the obstruction is passed, or when it is desired to rake out a hollow, the driver presses down the lever K with his foot, and thereby depresses the teeth.

The bearings $a$ $a$, that secure the frame of the machine to the axle, are extended backward somewhat to support a cleaner-bar, N. The cleaner-teeth O O, which, as usual, intervene between the rake-teeth, pass through this bar N, and extend over the axle to the cross-bar C, and are there fastened. From the bar N they extend obliquely upward, and, whenever the rake-teeth are raised to deposit the hay raked up by them, these cleaner-teeth detach the hay from them. By reason of the arrangement of the cleaner-bar slightly rearward of the axle, and a little below it, the hay is prevented from coming in contact with the axle and interfering with it.

To render the seat more comfortable, it may be attached to the machine in a manner to allow of its being elevated or depressed, as represented in the drawing.

What I claim as my invention is—

1. The combination of the sector J, provided with a series of holes, the lever H, having its fulcrum on the shaft or pivot of said sector, and the pin $p$, for locking the end of the aforesaid lever to the sector through means of one or other of the holes therein, substantially as herein described, for the purpose set forth.

2. The combination of the cam-faced foot-lever K with a pin or projection on the shifting-lever H, substantially as herein set forth, whereby the driver, at pleasure, may depress the rake-teeth by pressure exerted by his foot.

3. The combination of the cleaner-bar N, situated just in rear of the axle, and slightly below it, the cleaner-teeth O O passing through the said bar, and the upper bar C in which the teeth are fastened, essentially as and for the purpose described.

ALEXANDER RICKART.

Witnesses:
  THOMAS B. BORST,
  JACOB T. MIERS,
  JOHN GEBHARD, Jun.